US010392135B2

(12) United States Patent
Smith et al.

(10) Patent No.: US 10,392,135 B2
(45) Date of Patent: Aug. 27, 2019

(54) SATELLITE RADIATOR PANELS WITH COMBINED STIFFENER/HEAT PIPE

(71) Applicant: WorldVu Satellites Limited, St Helier, Jersey (CH)

(72) Inventors: Alexander D. Smith, San Jose, CA (US); Daniel W. Field, Sunnyvale, CA (US); Armen Askijian, Sunnyvale, CA (US); James Grossman, Sunnyvale, CA (US)

(73) Assignee: WorldVu Satellites Limited, McLean, VA (US)

( * ) Notice: Subject to any disclaimer, the term of this patent is extended or adjusted under 35 U.S.C. 154(b) by 709 days.

(21) Appl. No.: 14/673,215

(22) Filed: Mar. 30, 2015

(65) Prior Publication Data

US 2016/0288926 A1 Oct. 6, 2016

(51) Int. Cl.

| | |
|---|---|
| ***B64G 1/50*** | (2006.01) |
| ***B64G 1/58*** | (2006.01) |
| ***F28D 15/02*** | (2006.01) |
| ***F28F 1/16*** | (2006.01) |
| *B64G 1/10* | (2006.01) |
| *B64G 1/28* | (2006.01) |
| *B64G 1/40* | (2006.01) |

(Continued)

(52) U.S. Cl.

CPC ............. *B64G 1/503* (2013.01); *B64G 1/506* (2013.01); *B64G 1/58* (2013.01); *F28D 15/0233* (2013.01); *F28D 15/0275* (2013.01); *F28F 1/16* (2013.01); *B64G 1/10* (2013.01); *B64G 1/283* (2013.01); *B64G 1/40* (2013.01); *B64G 1/402* (2013.01); *B64G 1/50* (2013.01); *B64G 1/66* (2013.01); *F28F 2013/006* (2013.01)

(58) Field of Classification Search

CPC ........... B64G 1/506; B64G 1/503; B64G 1/50
See application file for complete search history.

(56) References Cited

U.S. PATENT DOCUMENTS

| | | | | |
|---|---|---|---|---|
| 4,706,740 A | 11/1987 | Mahefkey | | |
| 4,880,050 A * | 11/1989 | Nakamura | B64G 1/50 | 165/104.14 |
| 5,735,489 A | 4/1998 | Drolen et al. | | |

(Continued)

FOREIGN PATENT DOCUMENTS

| | | | |
|---|---|---|---|
| DE | 0843333 C | 7/1952 | |
| EP | 1031511 A2 * | 8/2000 | B64G 1/506 |

(Continued)

OTHER PUBLICATIONS

Collins English Dictionary, "Definition of 'panel'", 2010. Webster's New World College Dictionary, 4th Edition. Houghton Mifflin Harcourt. (Year: 2010).*

(Continued)

*Primary Examiner* — Richard R. Green
(74) *Attorney, Agent, or Firm* — Kaplan Breyer Schwarz, LLP

(57) ABSTRACT

A passive thermal system for use in satellites includes a solid radiator panel with a plurality of heat pipes attached to a surface thereof. In addition to their heat transporting capability, the heat pipes strengthen the radiator panel to which they are coupled. In some embodiments, the heat pipes are structurally modified to increase their area moment of inertia.

19 Claims, 6 Drawing Sheets

(51) Int. Cl.

| | |
|---|---|
| *B64G 1/66* | (2006.01) |
| *F28F 13/00* | (2006.01) |

(56) References Cited

U.S. PATENT DOCUMENTS

| | | | | |
|---|---|---|---|---|
| 5,806,803 | A * | 9/1998 | Watts | B64G 1/506 165/41 |
| 6,776,220 | B1 * | 8/2004 | Low | B64G 1/506 165/104.33 |
| 6,994,153 | B2 | 2/2006 | Nomura | |
| 9,828,116 | B1 * | 11/2017 | Mena | B64G 1/50 |
| 2006/0164809 | A1 * | 7/2006 | Yu | F28D 15/0233 361/704 |

FOREIGN PATENT DOCUMENTS

| | | | | |
|---|---|---|---|---|
| EP | 2332839 | A1 | 6/2011 | |
| EP | 2535276 | A1 * | 12/2012 | B64G 1/503 |
| EP | 2535276 | | 7/2014 | |
| FR | 2700609 | A1 | 7/1994 | |
| JP | 60-134601 | A | 7/1985 | |
| JP | 62-043900 | | 8/1985 | |
| JP | 62-096200 | A | 5/1987 | |
| JP | 06-020976 | | 1/1994 | |
| JP | 4040125 | B2 | 1/2008 | |
| JP | 2011-246112 | A | 12/2011 | |
| JP | 2013-184701 | A | 9/2013 | |
| KR | 1020110014856 | | 2/2011 | |
| KR | 1020110014856 | | 12/2011 | |
| WO | 2013/058490 | A2 | 4/2013 | |

OTHER PUBLICATIONS

Collins English Dictionary, "Definition of 'solid'", 2010. Webster's New World College Dictionary, 4th Edition. Houghton Mifflin Harcourt. (Year: 2010).*

Officer: Blaine R. Copenheaver, "International Search Report and Written Opinion" dated Jun. 20, 2016 in related PCT Application No. PCT/US2016/024916, Publisher: PCT.

Officer Agnes Wittmann-Regis, "International Preliminary Report on Patentability", International Patent Application No. PCT/US2016/024916, dated Oct. 12, 2017, 6 pp.

Supplementary European search report received for EP Patent Application No. 16774068.7, dated Aug. 6, 2018, 2 pages.

European search opinion received for EP Patent Application No. 16774068.7, dated Aug. 6, 2018, 6 pages.

Office Action issued in related Korean Patent Application No. 10-2017-7031249 dated Feb. 21, 2019.

Office Action dated Jan. 11, 2019 in related Japanese Patent Application No. 2017-551262.

* cited by examiner

SATELLITE RADIATOR PANELS WITH COMBINED STIFFENER/HEAT PIPE

FIELD OF THE INVENTION

The present invention relates to earth-orbiting communication satellites.

BACKGROUND OF THE INVENTION

Communication satellites receive and transmit radio signals from and to the surface of the Earth. Although Earth-orbiting communications satellites have been in use for many years, providing adequate cooling and heat distribution for the thermally sensitive electronics components onboard such satellites continues to be a problem.

There are two primary sources of heat with which a satellite's thermal systems must contend. One source is solar radiation. Solar radiation can be absorbed by thermal insulation shields or readily reflected away from the satellite by providing the satellite with a suitably reflective exterior surface. A second source of heat is the electronics onboard the satellite. The removal of electronics-generated heat is more problematic since such heat must be collected from various locations within the satellite, transported to a site at which it can be rejected from the satellite, and then radiated into space.

Passive thermal panels can be used to dissipate heat from satellites. In one configuration, the passive thermal panel includes a honeycomb core having heat pipes embedded therein. A heat pipe is a closed chamber, typically in the form of tube, having an internal capillary structure which is filled with a working fluid. The operating-temperature range of the satellite sets the choice of working fluid; ammonia, ethane and propylene are typical choices. Heat input (i.e., from heat-generating electronics) causes the working fluid to evaporate. The evaporated fluid carries the heat towards a colder heat-output section, where heat is rejected as the fluid condenses. The rejected heat is absorbed by the cooler surfaces of the heat-output section and then radiated into space. The condensate returns to the heat input section (near to heat-generating components) by capillary forces to complete the cycle.

The honeycomb core is typically a low strength, lightweight material. For this reason among any others, thin, stiff panels or "skins" are disposed on both major surfaces of the honeycomb core. The core is thus "sandwiched" between the skins. The strength of this composite is dependent largely on: (1) the outer skins and (2) an adhesive layer that bonds the honeycomb core and the skins. The panels are very expensive and labor intensive to manufacture but are required nearly everywhere that there are out-of-plane loads or modal concerns.

A second configuration of a passive thermal panel is simply a solid metallic skin. Such skins are, however, structurally inefficient for use in satellites since the skins' bending stiffness scales with the cube of its thickness. Unless expensive and heavy stiffeners are added to increase bending stiffness, such solid skins can only be used over short spans or with very little mass (i.e., structures) mounted thereto.

A need therefore remains for improvements in passive thermal panels for use in satellites.

SUMMARY OF THE INVENTION

The present invention provides an improved passive thermal system by coupling heat pipes to the surface of solid metallic radiators. In addition to providing their normal thermal function, the heat pipes serve as structural ribs to stiffen the panels.

This approach to a passive thermal system employs the heat pipe's cross section and area moment of inertia to maximum structural effect. This is to be contrasted with the prior art, wherein the heat pipes are embedded in the honeycomb core such that they lend virtually no structural support to the panels. As a consequence of reinforcing solid metallic radiator panels with heat pipes in accordance with the present teachings, the radiator panels can be thinner than otherwise would be the case, which equates to weight savings and cost savings.

In some embodiments, the heat pipes are structurally modified to increase their stiffness and that of the panel to which they are attached. In some embodiments, the modification increases the out-of-plane height of the heat pipe. More particularly, such modifications substantially increase the component of the "area moment-of-inertia" along an axis that is orthogonal to the plane of the radiator panel to which the modified heat pipe is attached.

The structural modification typically has little if any impact on the heat-transfer capabilities of the heat pipe. And of course, unlike terrestrial applications, wherein fins (usually 10 or more) are used for convective cooling, in the vacuum of space such fins will only radiate, offering far less potential for cooling.

Such modified heat pipes will typically have a single member (e.g., fin, etc.) extending from its main body (i.e., the bore containing portion of the heat pipe). In some embodiments, the modified heat pipe has two members extending therefrom. There would be minimal structural benefit to having three or more fins, yet there would be a weight penalty.

DETAILED DESCRIPTION

Embodiments of the present invention can be used for all types of satellites (e.g., LEO, GEO, etc.). Before addressing the specifics of the instant passive thermal system, a satellite in which such a system can be used is described.

Figure 1:
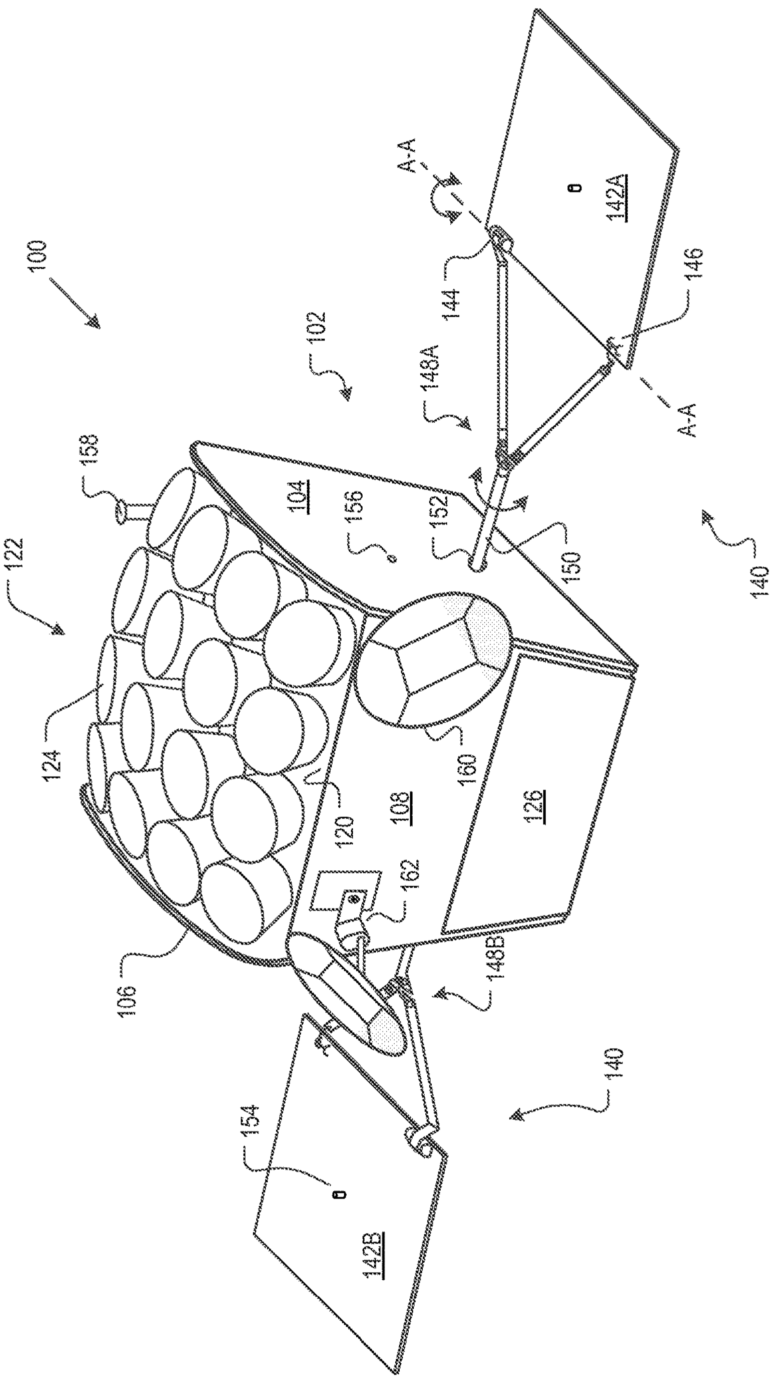
FIG. 1 depicts a satellite in accordance with the present teachings.
Figure 2:
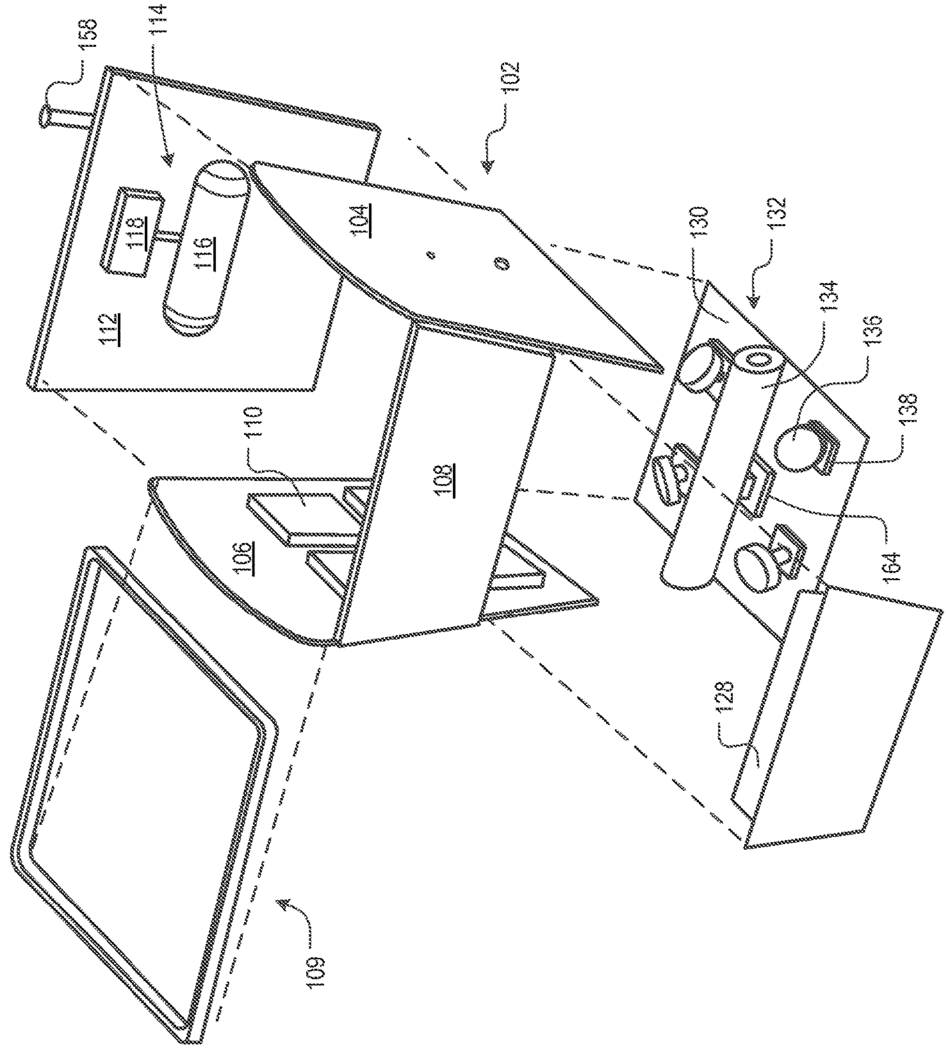
FIG. 2 depicts an exploded view of portions of the satellite of FIG. 1.

Satellite. FIG. 1 depicts satellite 100 in accordance with the present teachings. FIG. 2 depicts an "exploded" view of some of the salient features of satellite 100. Referring now to both FIGS. 1 and 2, satellite 100 includes unified payload module 102, propulsion module 114, payload antenna module 122, bus component module 132, and solar-array system 140, arranged as shown. It is to be noted that the orientation of satellite 100 in FIGS. 1 and 2 is "upside down" in the sense that in use, antennas 124, which are facing "up" in the figures, would be facing "down" toward Earth.

Unified payload module 102 comprises panels 104, 106, and 108. In some embodiments, the panels are joined together using various connectors, etc., in known fashion. Brace 109 provides structural reinforcement for the connected panels.

Panels 104, 106, and 108 serve, among any other functionality, as radiators to radiate heat from satellite 102. In some embodiments, the panels include adaptations to facilitate heat removal. In some embodiments, the panels comprise plural materials, such as a core that is sandwiched by face sheets. Materials suitable for use for the panels include those typically used in the aerospace industry. For example, in some embodiments, the core comprises a lightweight aluminum honeycomb and the face sheets comprise 6061-T6 aluminum, which are bonded together, typically with an epoxy film adhesive.

Propulsion module 114 is disposed on panel 112, which, in some embodiments, is constructed in like manner as panels 104, 106, and 108 (e.g., aluminum honeycomb core and aluminum facesheets, etc.). Panel 112, which is obscured in FIG. 1, abuts panels 104 and 106 of unified payload module 102.

Propulsion module 114 includes fuel tank 116 and propulsion control system 118. The propulsion control system controls, using one or more valves (not depicted), release of propulsion gas through the propulsion nozzle (not depicted) that is disposed on the outward-facing surface of panel 114. Propulsion control system is appropriately instrumented (i.e., software and hardware) to respond to ground-based commands or commands generated on-board from the control processor.

Payload antenna module 122 comprises a plurality of antennas 124. In the illustrative embodiments, sixteen antennas 124 are arranged in a 4×4 array. In some other embodiments, antennas 124 can be organized in a different arrangement and/or a different number of antennas can be used. Antennas 124 are supported by support web 120. In some embodiments, the support web is a curved panel comprising carbon fiber, with a suitable number of openings (i.e., sixteen in the illustrative embodiment) for receiving and supporting antennas 124.

In some embodiments, antennas 124 transmit in the $K_u$ band, which is the 12 to 18 GHz portion of the electromagnetic spectrum. In the illustrative embodiment, antennas 124 are configured as exponential horns, which are often used for communications satellites. Well known in the art, the horn antenna transmits radio waves from (or collects them into) a waveguide, typically implemented as a short rectangular or cylindrical metal tube, which is closed at one end and flares into an open-ended horn (conical shaped in the illustrative embodiment) at the other end. The waveguide portion of each antenna 124 is obscured in FIG. 1. The closed end of each antenna 124 couples to amplifier(s) (not depicted in FIGS. 1 and 2; they are located on the interior surface of panel 104 or 108).

Bus component module 132 is disposed on panel 130, which attaches to the bottom (from the perspective of FIGS. 1 and 2) of the unified payload module 102. Panel 130 can be constructed in like manner as panels 104, 106, and 108 (e.g., aluminum honeycomb core and aluminum facesheets, etc.). In some embodiments, panel 130 does not include any specific adaptations for heat removal.

Module 132 includes main solar-array motor 134, four reaction wheels 136, and main control processor 164. The reaction wheels enable satellite 100 to rotate in space without using propellant, via conservation of angular momentum. Each reaction wheel 136, which includes a centrifugal mass (not depicted), is driven by an associated drive motor (and control electronics) 138. As will be appreciated by those skilled in the art, only three reaction wheels 136 are required to rotate satellite 100 in the x, y, and z directions. The fourth reaction wheel serves as a spare. Such reaction wheels are typically used for this purpose in satellites.

Main control processor 164 processes commands received from the ground and performs, autonomously, many of the functions of satellite 100, including without limitation, attitude pointing control, propulsion control, and power system control.

Solar-array system 140 includes solar panels 142A and 142B and respective y-bars 148A and 148B. Each solar panel comprises a plurality of solar cells (not depicted; they are disposed on the obscured side of solar panels 142A and 142B) that convert sunlight into electrical energy in known fashion. Each of the solar panels includes motor 144 and passive rotary bearing 146; one of the y-bar attaches to each solar panel at motor 144 and bearing 146. Motors 144 enable each of the solar panels to at least partially rotate about axis A-A. This facilitates deploying solar panel 142A from its stowed position parallel to and against panel 104 and deploying solar panel 142B from its stowed position parallel to and against panel 106. The motors 144 also function to appropriately angle panels 142A and 142B for optimal sun exposure via the aforementioned rotation about axis A-A.

Member 150 of each y-bar 148A and 148B extends through opening 152 in respective panels 104 and 106. Within unified payload module 102, members 150 connect to main solar-array motor 134, previously referenced in conjunction with bus component module 132. The main solar-array motor is capable of at least partially rotating each member 150 about its axis, as shown. This is for the purpose of angling solar panels 142A and 142B for optimal sun exposure. In some embodiments, the members 150 can be rotated independently of one another; in some other embodiments, members 150 rotate together. Lock-and-release member 154 is used to couple and release solar panel 142A to side panel 104 and solar panel 142B to side panel 106. The lock-and-release member couples to opening 156 in side panels 104 and 106.

Satellite 100 also includes panel 126, which fits "below" (from the perspective of FIGS. 1 and 2) panel 108 of unified payload module 102. In some embodiments, panel 108 is a sheet of aerospace grade material (e.g., 6061-T6 aluminum, etc.) Battery module 128 is disposed on the interior-facing surface of panel 126. The battery module supplies power for various energy consumers onboard satellite 100. Battery module 128 is recharged from electricity that is generated via solar panels 142A and 142B; the panels and module 128 are electrically coupled for this purpose (the electrical path between solar panels 142A/B and battery module 128 is not depicted in FIGS. 1 and 2).

Satellite 100 further includes omni-directional antenna 158 for telemetry and ground-based command and control.

Disposed on panel 108 are two "gateway" antennas 160. The gateway antennas send and receive user data to gateway stations on Earth. The gateway stations are in communication with the Internet. Antennas 160 are coupled to panel 108 by movable mounts 162, which enable the antennas to be moved along two axes for optimum positioning with ground-based antennas. Antennas 160 typically transmit and receive in the $K_a$ band, which covers frequencies in the range of 26.5 to 40 GHz.

Convertor modules 110, which are disposed on interior-facing surface of panel 106, convert between $K_a$ radio frequencies and $K_u$ radio frequencies. For example, convertor modules 110 convert the $K_a$ band uplink signals from gateway antennas 160 to $K_u$ band signals for downlink via antennas 124. Convertor modules 110 also convert in the reverse direction; that is, $K_u$ to $K_a$.

In operation of satellite 100, data flows as follows for a data request:

(obtain data): requested data is obtained from the Internet at a gateway station;

(uplink): a data signal is transmitted ($K_a$ band) via large, ground-based antennas to the satellite's gateway antennas 160;

(payload): the data signal is amplified, routed to convertor modules 110 for conversion to downlink ($K_u$) band, and then amplified again;

the payload signal is routed to payload antennas 124;

(downlink): antennas 124 transmit the amplified, frequency-converted signal to the user's terminal.

When a user transmits (rather than requests) data, such as an e-mail, the signal follows the same path but in the reverse direction.

Passive Thermal System.

Figure 3:
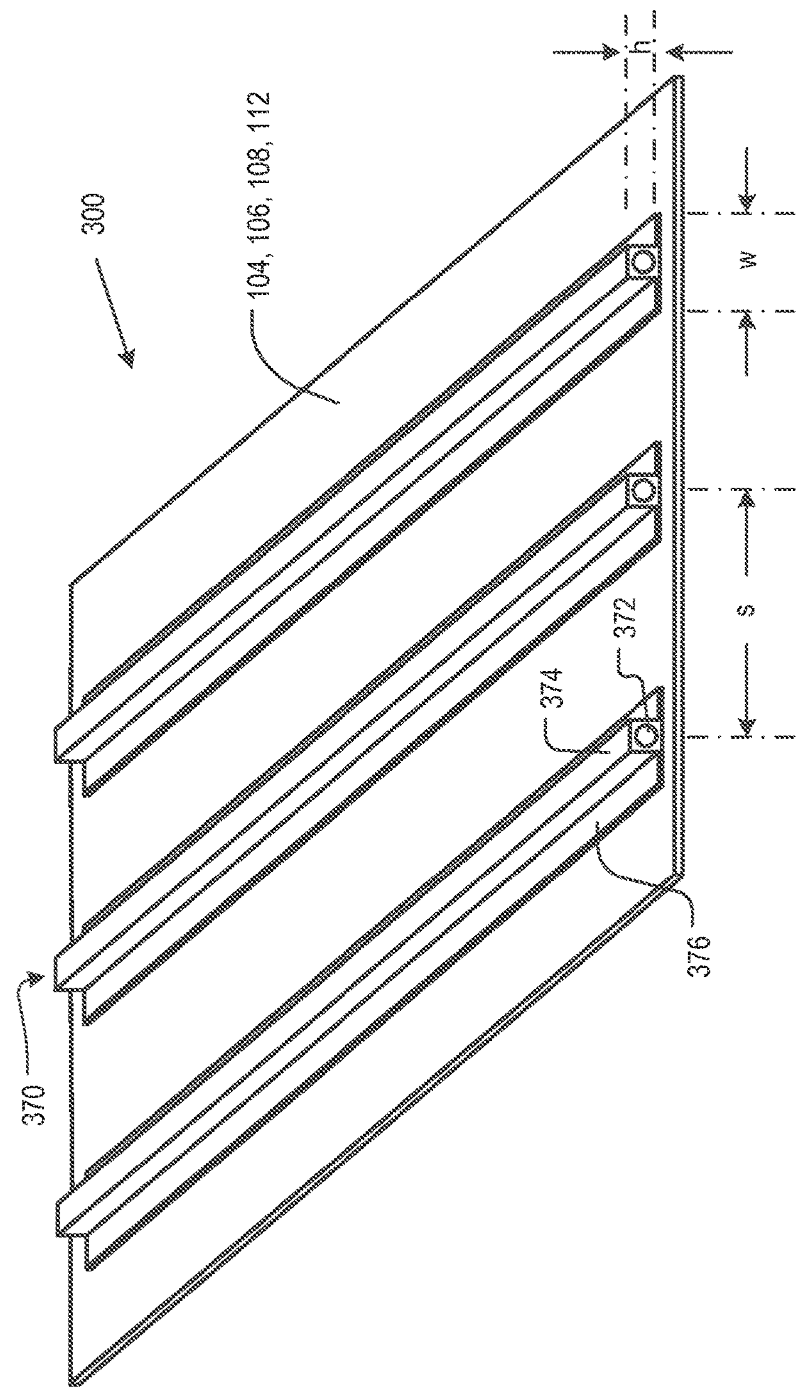
FIG. 3 depicts a first embodiment of a passive thermal system for use in conjunction with the satellite of FIGS. 1 and 2, in accordance with the illustrative embodiment of the present invention.

FIG. 3 depicts passive thermal system 300, which includes a solid radiator panel, such as panels 104, 106, 108, or 112, and one or more heat pipes 370. The heat pipes are attached to the panel via an epoxy film adhesive, for example, or other suitable bonding material known to those skilled in the art. Alternatively, heat pipes 370 can be bolted to the panels via standard fasteners in conjunction with thermal gasket material, which is compressed between heat pipes 370 and the panel.

The solid radiator panel is typically formed of a metal, such as aluminum. In the illustrative embodiment, passive thermal system 300 includes three heat pipes 370. The heat pipe includes main body 374 and flanges 376. Main body 374 includes bore 372. The bore extends the full length of main body 374 and contains heat-pipe fluid. The heat pipes are typically formed of aluminum.

Heat pipes 370 are conventional heat pipes. In the present context, a "conventional heat pipe" is defined for use in this disclosure and the appended claims as a heat pipe having no structural features external to main body 374, other than flanges 376 or other arrangements by which the heat pipe is attached to a surface, or caps that cap the ends of the heat pipe.

Two important considerations in the design of thin-walled structures, such as satellite 100, are the buckling stability and panel stiffness/vibrational frequency of the walls in this context—the radiator panels.

The radiator panels can be subjected to normal compressive and shearing loads. Under certain conditions, these loads can cause a panel to buckle. The buckling load of a standard solid radiator panel depends on its thickness; in particular, the thicker the plate (for a given material), the higher the critical buckling load.

The presence of heat pipes 370 on a solid radiator panel, in accordance with the present invention, provides a second variable that affects buckling load. As more heat pipes are added to the radiator panel, the spacing, s, between the heat pipes naturally decreases. For passive thermal system 300, the unsupported width of the solid radiator panels (i.e., the center-to-center spacing, s, between adjacent heat pipes 370) drives the buckling mode and associated eigenvalue. As a consequence, adding heat pipes 370 will provide additional buckling resistance to a solid radiator panel. Additionally, increasing width, w, of flange 376 will provide some additional buckling resistance and increase the critical buckling load. Although three heat pipes are depicted in the illustrative embodiment, more or fewer heat pipes can be used as is appropriate for the size and thickness of the radiator panel and the expected loads.

In the context of forces and deflections experienced by the radiator panels of satellite 100, it is panel stiffness, as opposed to buckling resistance, which will be the controlling design factor. With continued reference to FIG. 3, consider the tendency of passive thermal system 300 to bend along an axis that is normal to (but in-plane with) heat pipes 370. The stiffer the heat pipes, the greater the resistance to bending exhibited by passive thermal system 300.

In accordance with some embodiments of the present teachings, passive thermal system includes heat pipes that include a physical adaptation for increasing the stiffness of the heat pipes and the combined heat pipes/radiator panel beyond any benefit provided to such a panel by unmodified heat pipes, such as heat pipes 370.

The stiffness of the heat pipes, and hence passive thermal system 300, can be increased by making, the heat pipes taller out-of-plane. This principle is illustrated via FIGS. 9A through 9C.

Figures 9A, 9B, 9C:
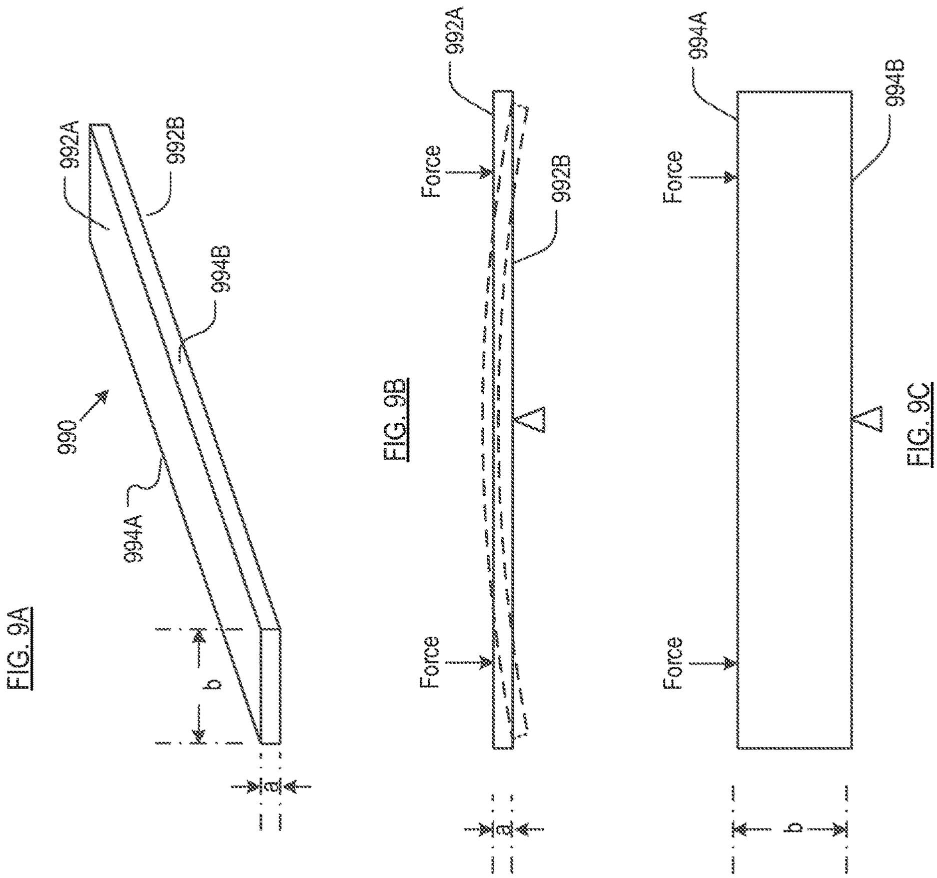
FIGS. 9A-9C depict a beam and its ability to resist deflection as a function of the location of an applied force.

FIG. 9A depicts a perspective view of a beam 990. The beam has the indicated dimensions, wherein the dimension "b" is six times larger than the dimension "a"; that is, b=6a. FIG. 9B depicts beam 990 oriented such that it is supported at the midpoint of major surface 992B. In this orientation, the "height" of beam 990 is "a". FIG. 9C depicts beam 990 oriented such that it is supported at the midpoint of edge 992B. In this orientation, the "height" of beam 990 is "b" or 6×a.

If force is applied to surface 992A as depicted in FIG. 9B, beam 990 will bend in the manner shown far more readily than if the same amount of force were applied to surface 994A s depicted in FIG. 9C. It will be a appreciated from these figures that, with height defined as shown and force applied as shown, increasing the height of the beam greatly increases its stiffness to bending in the indicated direction.

A heat pipe that is modified with the explicit intent of increasing its stiffness without regard to any thermal considerations concerning the heat pipe is referred to in this disclosure and the appended claims as a "structural heat pipe". A "structural heat pipe" is defined for use in this disclosure and the appended claims as a heat pipe that is structurally modified to substantially increase the component of the "area moment-of-inertia" along an axis that is orthogonal to the plane of the radiator panel. In this context, "substantially increase" means to increase by 50% or more. As is relevant to embodiments of the invention, increasing the component of the "area moment-of-inertia" along an axis that is orthogonal to the plane of the radiator panel means increasing the height of heat pipe, wherein "height" is referenced with respect to the radiator panel to which the structural heat pipe is coupled.

Embodiments of the present invention do not contemplate using a heat pipe that is larger than what is required for the calculated thermal load. In other words, embodiments of the invention do not contemplate, and explicitly exclude, using an oversized (based on thermal requirements) heat pipe as a way to increase the aforementioned area moment-of-inertia. Doing so would add too much mass.

Rather, in accordance with the present teachings, the area moment-of-inertia along an axis that is orthogonal to the plane of the radiator panel heat pipe is increased via structural modifications that typically do not impact the heat-carrying capacity of the heat pipe (e.g., no increase in bore diameter, no structural alterations that result in an increase in the quantity of heat pipe fluid etc.) or would have, at best, minimal impact on the heat transfer capabilities of the heat pipe. In this context, "minimal impact" means "less than 5 percent".

FIGS. 4 through 8 depict, via an end view, passive thermal systems comprising structural heat pipes; that is, heat pipes that are structurally modified to increase their stiffness and that of the attached radiator. It is to be understood that the structures shown in FIGS. 4 through 8 extend "into the page." In other words, if these Figures were presented via perspective views like FIG. 3, the structural heat pipes would be seen to extend longitudinally like the conventional heat pipes shown in FIG. 3.

Figure 4:
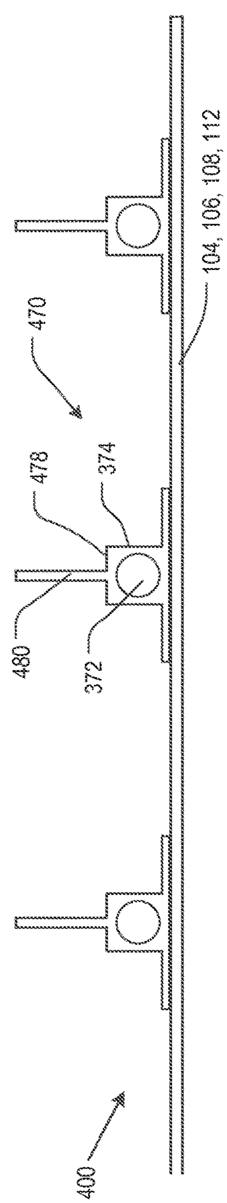
FIG. 4 depicts a second embodiment of a passive thermal system for use in conjunction with the satellite of FIGS. 1 and 2, in accordance with the illustrative embodiment of the present invention.

FIG. 4 depicts passive thermal system 400 comprising a solid radiator panel, such as panels 104, 106, 108, and 112 and structural heat pipes 470. Each structural heat pipe 470 includes a straight vertical fin 480 that extends away from the solid radiator panel and from a position proximal to top 478 of main body 374 of structural heat pipe 470. As used herein, the phrase "top of the main body of the structural heat pipe" means the location on the portion of the heat pipe that contains bore 372 that is furthest from the radiator panel. So, for example, if the FIG. 4 were inverted such that heat pipes 470 were facing "downward," the "top of the main body of the structural heat pipe" is the same location on heat pipes 470 as in FIG. 4.

Such a fin is not present on a conventional heat pipe. The vertical fin increases the out-of-plane height of heat pipe 470 relative to the unmodified heat pipe 370. This increase in out-of-plane height increases the "area moment-of-inertia" of the heat pipes 470 and the heat pipe/panel assembly (i.e., passive thermal system 400). The increase in area moment of inertia equates to an increase in stiffness.

In the embodiment depicted in FIG. 4, fin 480 is orthogonal to the radiator panel. In some other embodiments, fin 480 is not orthogonal to the radiator panel. The latter case might be dictated, for example, in a situation in which there insufficient clearance for an orthogonally oriented fin.

In some further embodiments, a passive thermal system in accordance with the present teachings has two straight vertical fins (each like fin 480) that extend away from the solid radiator panel and from a position proximal to top 478 of main body 374 of structural heat pipe 470. In preferred embodiments, both fins are orthogonal to the radiator panel. However, if space or other constraints dictate otherwise, the fins can be oriented non-orthogonal to the radiator panel.

Figure 5:
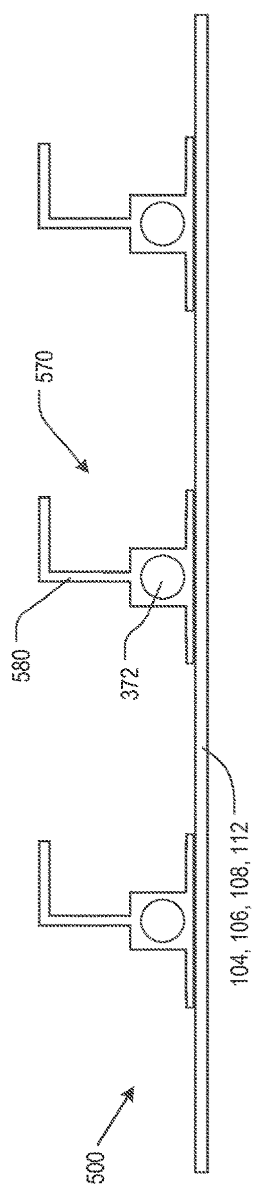
FIG. 5 depicts a third embodiment of a passive thermal system for use in conjunction with the satellite of FIGS. 1 and 2, in accordance with the illustrative embodiment of the present invention.

FIG. 5 depicts passive thermal system 500 comprising a solid radiator panel, such as panels 104, 106, 108, and 112 and structural heat pipes 570. Each structural heat pipe 570 includes L-shaped fin 580. The L-shaped fin increases the out-of-plane height of heat pipe 570 relative to the unmodified heat pipe 370, which, as previously noted, increases the area moment of inertia of the heat pipes 570 and the heat pipe/panel assembly (i.e., passive thermal system 500). The L-shaped fin requires less out-of-plane clearance than a fin that is straight and has the same amount of mass and the same fin thickness. The L-shaped fin also provides more lateral stability to heat pipes 570, which might be required in some embodiments.

Figure 6:
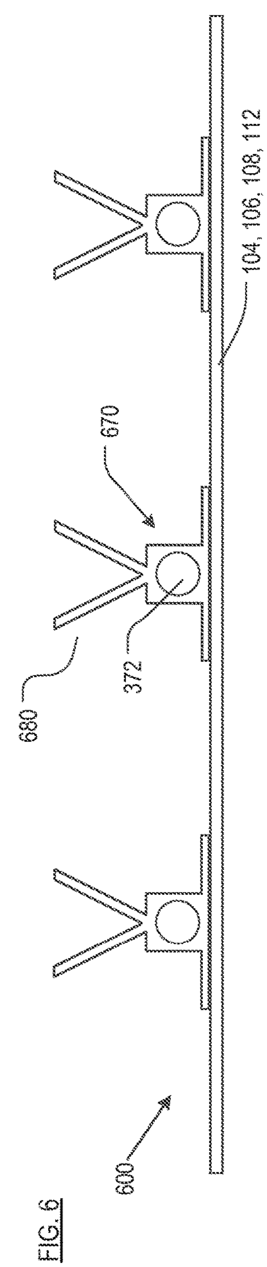
FIG. 6 depicts a fourth embodiment of a passive thermal system for use in conjunction with the satellite of FIGS. 1 and 2, in accordance with the illustrative embodiment of the present invention.

FIG. 6 depicts passive thermal system 600 comprising a solid radiator panel, such as panels 104, 106, 108, and 112 and structural heat pipes 670. Each structural heat pipe 670 includes double fin 680. The double fin increases the out-of-plane height of heat pipes 670 relative to the unmodified heat pipe 370, and, hence, increases the area moment of inertia of the heat pipes 670 and the heat pipe/panel assembly (i.e., passive thermal system 600). Like L-shaped fin 580, double fin 680 also improves the lateral stability of structural heat pipe 670, but is typically preferred to L-shaped fin 580 due to the lack of symmetry of the L-shaped fin.

Figure 7:
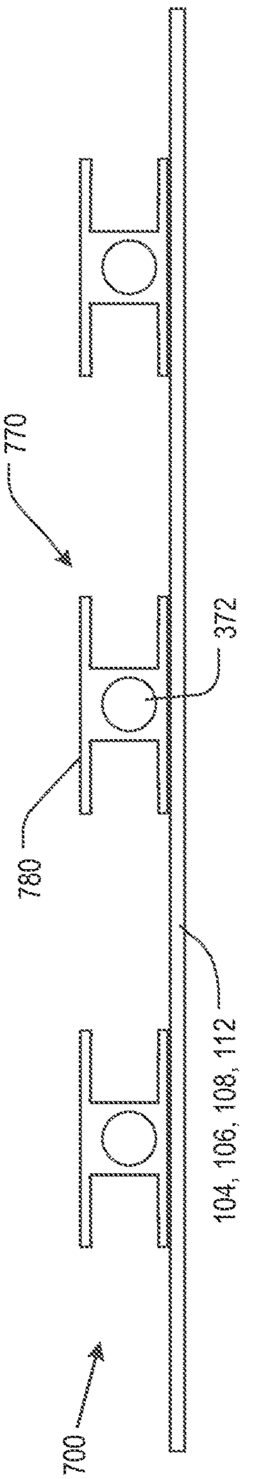
FIG. 7 depicts a fifth embodiment of a passive thermal system for use in conjunction with the satellite of FIGS. 1 and 2, in accordance with the illustrative embodiment of the present invention.

FIG. 7 depicts passive thermal system 700 comprising a solid radiator panel, such as panels 104, 106, 108, and 112 and structural heat pipes 770. Each structural heat pipe 770 includes a horizontal plate 780, providing a classic "I-beam" configuration. Although structural heat pipe 770 does not possess the out-of-plane height of, for example, structural heat pipe 470 the I-beam configuration does improve stiffness relative to a conventional heat pipe having the same size.

Figure 8:
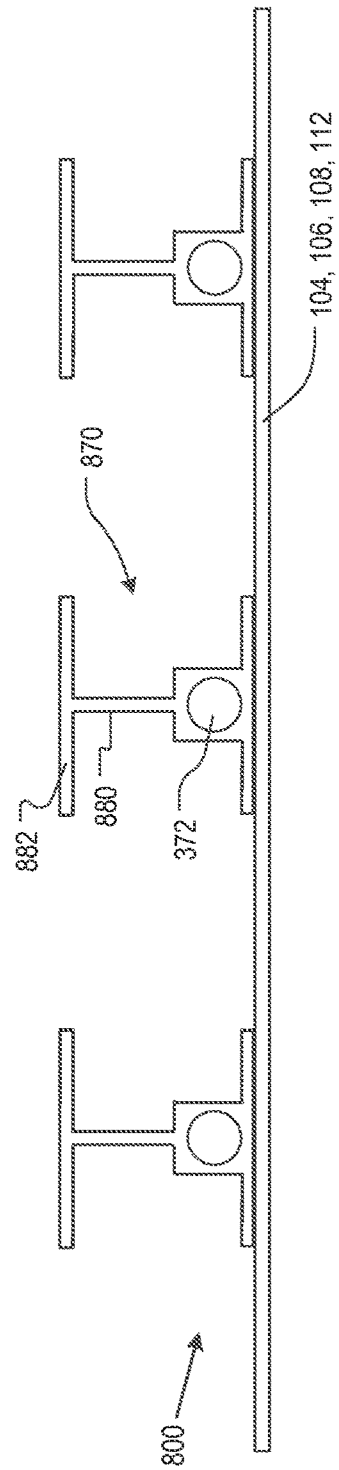
FIG. 8 depicts a sixth embodiment of a passive thermal system for use in conjunction with the satellite of FIGS. 1 and 2, in accordance with the illustrative embodiment of the present invention.

FIG. 8 depicts passive thermal system 800 comprising a solid radiator panel, such as panels 104, 106, 108, and 112 and structural heat pipes 870. Each structural heat pipe 870 includes vertical fin 880 and horizontal plate 882 providing a "tall" l-beam configuration. The additional out-of-plane height of structural heat pipe 870 makes it stiffer than structural heat pipe 770 and, of course, stiffer than unmodified heat pipe 370.

In structural heat pipes 470, 570, 670, 770 and 870, the main body of the heat pipe is structurally modified. In some other embodiments, rather than altering the main body of the heat pipe, a height-increasing feature is coupled to the main body, such as with appropriate fasteners or adhesive.

In the illustrative embodiments, heat pipes 370 and structural heat pipes 470 through 870 are depicted as being straight and arranged parallel to one another on a surface of the radiator panel. In some other embodiments, heat pipes 370 and structural heat pipes in accordance with the present teachings are:

(i) not straight (they are curved, etc.); or (ii) straight but not parallel with respect to one another on the surface of the radiator panel; or (iii) not straight and not parallel with respect to one another on the surface of the radiator.

In light of the present disclosure and without deviating from the present teachings, those skilled in the art will be able to design and implement additional configurations of structural heat pipes having increased stiffness and passive thermal systems incorporating same.

It is to be understood that the disclosure describes a few embodiments and that many variations of the invention can easily be devised by those skilled in the art after reading this disclosure and that the scope of the present invention is to be determined by the following claims.

What is claimed is:

1. An apparatus comprising a passive thermal system, wherein the passive thermal system comprises:

a solid radiator panel; and at least one structural heat pipe disposed on a surface of the solid radiator panel wherein a structural heat pipe has a structural modification that increases, by at least 50 percent, a component of the area moment-of-inertia along an axis that is orthogonal to the surface of the solid radiator panel.

2. The apparatus of claim 1 wherein the structural heat pipe has two straight fins that extend away from the solid radiator panel from a position proximal to a top of a main body of the structural heat pipe.

3. The apparatus of claim 1 wherein the structural heat pipe has one straight fin.

4. The apparatus of claim 3 wherein the one straight fin extends from a top of a main body of the structural heat pipe and aligns with a midpoint between a left side and a right side thereof.

5. The apparatus of claim 4 wherein the fin is orthogonal to the solid radiator panel.

6. The apparatus of claim 2 wherein the structural heat pipe has two fins, and wherein the two fins collectively form a v-shape, the v-shape defining an acute angle.

7. The apparatus of claim 1 wherein the structural heat pipe comprises an L-shape member, the L-shape member having a first portion extending away from the solid radiator panel and from a position proximal to a top of a main body of the structural heat pipe.

8. The apparatus of claim 7 the first portion of the L-shape member is oriented orthogonally with respect to the solid radiator panel.

9. The apparatus of claim 7 wherein a second portion of the L-shape member is oriented in parallel with respect to the solid radiator panel.

10. The apparatus of claim 7 wherein the first portion aligns with a midpoint between a left side and a right side of the main body of the structural heat pipe.

11. The apparatus of claim 1 wherein the structural heat pipe comprises a t-shape member having a first portion extending away from the solid radiator panel and from a position proximal to a top of a main body of the structural heat pipe.

12. The apparatus of claim 11 wherein the first portion of the t-shape member is oriented orthogonally with respect to the solid radiator panel.

13. The apparatus of claim 11 wherein a second portion of the t-shape member is oriented in parallel with respect to the solid radiator panel.

14. The apparatus of claim 11 wherein the first portion aligns with a midpoint between a left side and a right side of the main body of the structural heat pipe.

15. The apparatus of claim 1 wherein the apparatus is a satellite.

16. The apparatus of claim 1 wherein there are at least two structural heat pipes disposed on the surface of the radiator panel, wherein the at least two structural heat pipes are not parallel with respect to one another.

17. The apparatus of claim 1 wherein the at least one structural heat pipe is not straight.

18. A satellite comprising a plurality of solid radiator panels, wherein at least one of the radiator panels is configured as a passive thermal system wherein one or more structural heat pipes are disposed on a surface of the solid radiator panel wherein a structural heat pipe has a structural modification that increases, by at least 50 percent, a component of the area moment-of-inertia along an axis that is orthogonal to the surface of the solid radiator panel.

19. The satellite of claim 18 wherein at least two of the radiator panels are configured as passive thermal systems wherein one or more structural heat pipes are disposed on each of the at least two radiator panels.

* * * * *